UNITED STATES PATENT OFFICE.

FRANZ ELGER, OF BASEL, SWITZERLAND, ASSIGNOR TO HOFFMANN-LA ROCHE CHEMICAL WORKS, OF NEW YORK, N. Y., A CORPORATION OF NEW YORK.

META-CRESOL AND PROCESS OF MAKING THE SAME.

1,025,616.   Specification of Letters Patent.   Patented May 7, 1912.

No Drawing.   Application filed December 16, 1911. Serial No. 666,198.

*To all whom it may concern:*

Be it known that I, FRANZ ELGER, a subject of the Austro-Hungarian Empire, and a resident of Basel, Switzerland, have invented a certain new and useful Meta-Cresol and Process of Making the Same, of which the following is a specification.

This invention relates to the manufacture of meta-cresol and has for its object to produce such meta-cresol, which shall be for practical purposes a pure product.

The ordinary meta-cresol of commerce of the present day contains, according to its quality, about 80 to 92 per cent. of meta-cresol. Several attempts have been made to isolate meta-cresol, but so far as I am aware, none of these attempts can be said to have produced the result aimed at. The purest meta-cresol of which I have found mention in literature was a meta-cresol produced from meta-toluidin and is a product which becomes rigid under rigorous cooling after the mass is inoculated with a small amount of phenol. The meta-cresol thus produced did not become solid at —18° but only at a very much lower temperature and after it had solidified, it melted at 3 to 4°. At very low temperatures, there were indications of a crystalline structure. This product is described by Staedel in the *Berliner Berichte*, Vol. 18, page 3443, but is not, as has been heretofore assumed, a pure product. Other attempts in the same direction, such as the meta-cresol made from thymol, or the synthetic meta-cresol, or those produced in other ways, do not appear to exist in crystalline or solid form above zero degrees C.

The meta-cresol, the subject matter of this application, is an entirely colorless liquid, which, after exposure to light for some time becomes slightly yellow. The solidifying temperature of this product is very much higher than that of any form of meta-cresol known and lies approximately at 11.2° C. When the liquid cresol is cooled, it solidifies spontaneously, but more readily if the solidification is assisted by inoculation or seeding with phenol, or of a pure meta-cresol crystal. As it solidifies, it turns into a dazzling white mass of crystals, whose form resembles somewhat that of phenol crystals. The para-cresol, on the other hand, crystallizes in plates. When the solidification of the meta-cresol takes place slowly, long needles are formed, passing through the entire vessel with an apparent nucleus at the point of inoculation. This high solidification point of approximately 11.2° C. is, of course, the salient characteristic of the pure meta-cresol produced by me. It will vary slightly according to the conditions prevailing in the place where the experiments are conducted and the exactness of the observations and accuracy and speed of thermometers, the barometric pressure, as also according as this temperature is treated as the melting point of the crystals or the freezing point of the liquid. When, therefore, in the claims I speak of the temperature of 11.2° C., or approximately 11° C., I intend to include all such variations, the test being the high solidification point rather than the particular or specific degree or fraction thereof.

There are numerous methods of producing the pure meta-cresol of this invention. One convenient method is that described in my companion application, Serial No. 655,562, filed October 19, 1911. If the sulfonation treatment of that application is repeated, the pure meta-cresol will result. The sulfonation treatment of this companion application, if applied but once, results in a product which still contains a noticeable proportion of the para compound. If that meta-cresol thus obtained is again subjected to the same sulfonating treatment carried on under conditions appropriate to the quantity and components of the meta-cresol obtained from the first treatment, then the pure meta-cresol of this application will be obtained from the thus isolated meta-cresol-mono-sulfo acid. It is, therefore, obvious that for the purpose of creating the pure product, I may employ for the final sulfonating treatment not only the meta-cresol which has been separated from the mixture of meta- and para-cresol in accordance with the directions of my pending application, but the ordinary meta-cresol of commerce no matter how produced. An example of this method of proceeding is here given. 1,000 kg. of ordinary meta-cresol (composed of approximately 90% meta and 10% para) are sulfonated with 900 kg. concentrated sulfuric acid (of 66% Be.) being well stirred at a temperature below 100°. After the sulfonation is complete, the reaction mixture is permitted to cool whereby the sulfo acid of the meta-cresol crystallizes out. A good part of pure meta-cresol may be separated from this sulfo acid by the use of superheated steam. There are, however, a number of other methods of creating the product. For instance, by employing crystallization in connection with crude meta-cresol-sulfo acid, it is possible to obtain a pure meta-cresol-sulfo acid which will then produce pure meta-cresol when split into its component parts. An example of this method of proceeding is here given. 500 kg. of meta-cresol (produced in accordance with the process of my pending application and containing approximately 92% meta and 8% para) are sulfonated with 400 kg. fuming sulfuric acid containing about 20% $SO^3$, being well stirred at a temperature below 100°. After the sulfonation is complete, the reaction mixture is mixed with 260 kg. 50% sulfuric acid, the unsulfonated crystal is extracted with benzol and the solution is then permitted to cool slowly. The meta-cresol-sulfo acid, when crystallized out, results in a good proportion of pure meta-cresol when treated with superheated steam.

A further very simple process of obtaining meta-cresol is to cool a low temperature ordinary commercial meta-cresol which, as already stated, contains about 80–92% of this product. By this process a part of the meta-cresol is crystallized out and can then be separated from the mother liquor by centrifugal or other similar means. The mother liquor may also be again subjected to the separating process. This last mentioned process is preferred because of its simplicity. According to this last mentioned process, the ordinary commercial meta-cresol can be converted into a very pure product by cooling it to a low temperature and then inoculating it with a crystal of pure meta-cresol and then allowing it to stand at the low temperature for a considerable period of time. The meta-cresol then crystallizes out and may be separated from the mother liquor consisting of the remainder of the meta-cresol and of para-cresol by means of centrifugal or other means. As an example of this process, I may mention the following: 1000 kg. commercial meta-cresol are cooled to −2°. A few crystals of pure meta-cresol are then added. Allow the substance to stand at this temperature for about 12 hours and then separate the crystals of pure meta-cresol thus produced by means of centrifugal apparatus. This product is extraordinarily pure. A further example of this same process following the process of my pending application may also be given. 1000 kg. of a mixture of meta and para-cresol (about 60% meta and 40% para) are sulfonated with 750 kg. fuming sulfuric acid (20% $So^3$), being well stirred at a temperature below 100°. After the close of the sulfonating process, the reaction mixture is mixed with 500 kg. of sulfuric acid of 50% strength, the unsulfonated cresol is extracted with benzene at a temperature of about 50° and the solution is permitted to cool slowly. From this solution the meta-cresol-sulfo acid is obtained. This acid is dissolved under slight warming with 60% sulfuric acid in suitable quantities (for each 1000 kg. sulfo acid 500 kg. 60% $H^2SO^4$). Upon cooling, the meta-cresol-sulfo acid crystallizes in adequate proportions and yields the pure metal-cresol upon being split into its components. The purification of the sulfo acid may, however, take place in other ways, as for instance, by kneading the crude meta-cresol-sulfo acid with hydrochloric acid, allowing this to stand for some time and then separating the sulfo-acid centrifugally, or otherwise. The meta-cresol sulfo-acid may also be purified by first dissolving it in water and then adding concentrated sulfuric acid and finally cooling the mixture. The solubility of the meta-cresol-sulfo acid decreases as the strength of sulfuric acid in the aqueous solution is increased. The addition of sulfuric acid to the aqueous solution, however, causes a rise in temperature which will prevent the meta-cresol-sulfo acid from separating out, because at higher temperatures, it is more soluble in dilute sulfuric acid. It is not until the mixture is cooled that the pure product crystallizes out of the solution.

It will thus be seen that the process which I employ results in the isolation of meta-cresol from a mixture containing as its major constituent meta-cresol. Thus, in the various examples, it will be seen that before isolating the meta-cresol or the meta-cresol compound (for instance meta-cresol-mono-sulfo acid) I first bring the impure mixture to a condition in which the meta-cresol predominates; then from the mixture in this condition, I extract, not the impurities or para-cresol, but the meta-cresol itself. This is done either by converting it into a pure meta-cresol-mono-sulfo acid and then breaking that into its components, or by taking the unpurified meta-cresol-mono-sulfo acid and splitting it into its components without further purification, and then subjecting the thus obtained meta-cresol to low temperatures so as to permit crystallization of the pure meta-cresol, or by subjecting the ordinary commercial meta-cresol to the freezing process and inoculating when desired with a pure meta-cresol crystal.

It is manifest that the various methods of obtaining the pure meta-cresol of this application are for the purposes of this application equivalents of each other. A similar equivalency exists with respect to the substance employed for inoculating the liquid to start the formation of meta-cresol crystals.

I claim:

1. Meta-cresol in the form of a colorless liquid, becoming slightly yellowish when exposed to light for some time and solidifying at approximately 11° C.

2. The process of producing meta-cresol having the property of being a crystalline solid at approximately 11° C., and of existing as a colorless liquid turning yellowish upon continual exposure to light, which consists in employing a mixture dominatingly rich in meta-cresol as a starting material and applying to it a selective agent to cause the pure meta-cresol to enter into the composition of a crystalline body and suitably separating the meta-cresol thus obtained from the other constituents.

3. The process of producing meta-cresol having the property of being a crystalline solid at approximately 11° C., and of existing as a colorless liquid turning yellowish upon continual exposure to light, which consists in employing a mixture dominatingly rich in meta-cresol as a starting material and producing a crystalline body containing as its sole cresol component the meta-cresol, by applying to the starting material a selective agent to act selectively upon the meta-cresol constituent and to cause it to subsist as a pure meta-cresol component of the crystalline body, and separating said pure meta-cresol from the other constituents.

4. The process of producing meta-cresol having the property of being a crystalline solid at approximately 11° C., and of existing as a colorless liquid turning yellowish upon continual exposure to light, which consists in reducing the temperature of ordinary commercial meta-cresol to a temperature approximating 0° C., permitting the cooled substance to stand for some time, causing the pure meta-cresol to separate itself from the cooled liquid in the form of pure meta-cresol crystals.

5. The process of producing meta-cresol having the property of being a crystalline solid at approximately 11° C., and of existing as a colorless liquid turning yellowish upon continual exposure to light, which consists in reducing the temperature of ordinary commercial meta-cresol (containing approximately 80% to 92% meta-cresol) to a temperature approximating 0° C., permitting the cooled substance to stand for some time, causing the pure meta-cresol to separate itself from the cooled liquid in the form of pure meta-cresol crystals extending in long crystals throughout the vessel from a nucleus formed by inoculating the cooled substance with a pure meta-cresol crystal previously formed.

In testimony whereof I have hereunto set my hand in the presence of two subscribing witnesses.

FRANZ ELGER.

Witnesses:
 HEINRICH KUBLI,
 PETER METZGER.